(12) United States Patent  
Byun et al.

(10) Patent No.: US 8,367,242 B2
(45) Date of Patent: Feb. 5, 2013

(54) RECHARGEABLE BATTERY

(75) Inventors: Sang-Won Byun, Yongin-si (KR);
Jeong-Won Oh, Yongin-si (KR);
Sang-Shin Choi, Yongin-si (KR);
Jae-Wook Lee, Yongin-si (KR);
Yong-Hae Kang, Yongin-si (KR)

(73) Assignees: Samsung SDI Co., Ltd., Yongin, Gyeonggi-do (KR); Robert Bosch GmbH, Stuttgart (DE)

( * ) Notice: Subject to any disclaimer, the term of this patent is extended or adjusted under 35 U.S.C. 154(b) by 35 days.

(21) Appl. No.: 12/929,035

(22) Filed: Dec. 23, 2010

(65) Prior Publication Data

US 2012/0021277 A1   Jan. 26, 2012

(30) Foreign Application Priority Data

Jul. 21, 2010   (KR) .......................... 10-2010-0070495

(51) Int. Cl.
*H01M 2/02* (2006.01)
*H01M 6/00* (2006.01)
*H01M 2/00* (2006.01)
*H01M 2/08* (2006.01)

(52) U.S. Cl. ........ 429/178; 429/122; 429/163; 429/164; 429/171; 429/179

(58) Field of Classification Search .................. 429/171, 429/164, 179, 122, 162, 163, 178
See application file for complete search history.

(56) References Cited

U.S. PATENT DOCUMENTS

| 6,207,320 | B1* | 3/2001 | Song et al. ................... 429/171 |
| 2001/0004505 | A1* | 6/2001 | Kim et al. ..................... 429/180 |
| 2006/0083982 | A1* | 4/2006 | Jung et al. .................... 429/164 |
| 2008/0102356 | A1* | 5/2008 | Choi ............................. 429/122 |
| 2009/0186269 | A1* | 7/2009 | Kim et al. ..................... 429/179 |

FOREIGN PATENT DOCUMENTS

| JP | 2005-332700 A | 12/2005 |
| KR | 10 2005-0039387 A | 4/2005 |
| KR | 10 2008-0036743 A | 4/2008 |
| KR | 10 2008-0037860 A | 5/2008 |

OTHER PUBLICATIONS

PDF of Merriam-Webster Dictionary web page, accessed on Feb. 14, 2012.*

* cited by examiner

*Primary Examiner* — Patrick Ryan
*Assistant Examiner* — Alex Usyatinsky
(74) *Attorney, Agent, or Firm* — Lee & Morse, P.C.

(57) ABSTRACT

A rechargeable battery including an electrode assembly, the electrode assembly including a separator interposed between a first electrode and a second electrode; a case, the case accommodating the electrode assembly; a cap plate, the cap plate sealing an opening at one end of the case; and electrode terminals, the electrode terminals being electrically connected to the electrode assembly, wherein at least one of the electrode terminals is integrally formed with the cap plate.

10 Claims, 6 Drawing Sheets

RECHARGEABLE BATTERY

BACKGROUND

1. Field

Embodiments relate to a rechargeable battery.

2. Description of the Related Art

A rechargeable battery is a battery that may be repetitively charged and discharged. Low-capacity rechargeable batteries may be used for portable compact electronic devices, e.g., mobile phones, notebook computers, and camcorders. High-capacity rechargeable batteries may be used as a power source for, e.g., driving a motor of a hybrid vehicle, etc.

In recent years, a high-output rechargeable battery using a non-aqueous liquid electrolyte of high energy density has been developed. The high-output rechargeable battery may be used to drive an apparatus requiring high power, e.g., a motor of an electric vehicle, or the like.

The above information disclosed in this Background section is only for enhancement of understanding of the background of the invention and therefore it may contain information that does not form the prior art that is already known in this country to a person of ordinary skill in the art.

SUMMARY

Embodiments are directed to a rechargeable battery.

At least one of the above and other features and advantages may be realized by providing a rechargeable battery including an electrode assembly, the electrode assembly including a separator interposed between a first electrode and a second electrode; a case, the case accommodating the electrode assembly; a cap plate, the cap plate sealing an opening at one end of the case; and electrode terminals, the electrode terminals being electrically connected to the electrode assembly, wherein at least one of the electrode terminals is integrally formed with the cap plate.

A protrusion height of the at least one electrode terminal integrally formed with the cap plate may be about equal to a height of another of the electrode terminals.

The cap plate may include a first surface facing an inside of the case and a second surface facing an outside of the case, and the at least one electrode terminal integrally formed with the cap plate may protrude outwardly on the second surface of the cap plate.

The electrode terminals may include a first electrode terminal connected to the first electrode and a second electrode terminal connected to the second electrode, the first electrode terminal may extend through a terminal hole on the cap plate with a gasket interposed between the first electrode terminal and the cap plate, and the second electrode terminal may be integrally formed with the cap plate.

The second electrode terminal may include a concave groove, the concave groove having a concavity facing toward an inside of the case and being formed by shaping the cap plate.

The rechargeable battery may further include a pole portion, the pole portion being between the second electrode terminal and a lead tab, the pole portion contacting the second electrode terminal and the lead tab.

The pole portion may include a plate, the plate being connected to the first surface of the cap plate outside of the concave groove.

The pole portion may include a plate; a first protrusion portion, the first protrusion portion being inserted into the concave groove; and a second protrusion portion, the second protrusion portion being inserted into and coupled to a first through-hole of the lead tab.

The first protrusion portion may be coupled to the concave groove, and the plate may be coupled to the first surface of the cap plate outside of the concave groove.

The lead tab may further include a second through-hole adjacent to the first through-hole, and the pole portion may further include a third protrusion portion, the third protrusion portion being inserted into and coupled to the second through-hole.

The lead tab may be connected to the first surface of the cap plate around the concave groove.

The rechargeable battery may further include a plate and a lead tab, the plate being connected to the first surface of the cap plate outside of the concave groove and to the lead tab, the lead tab being connected to the electrode assembly.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
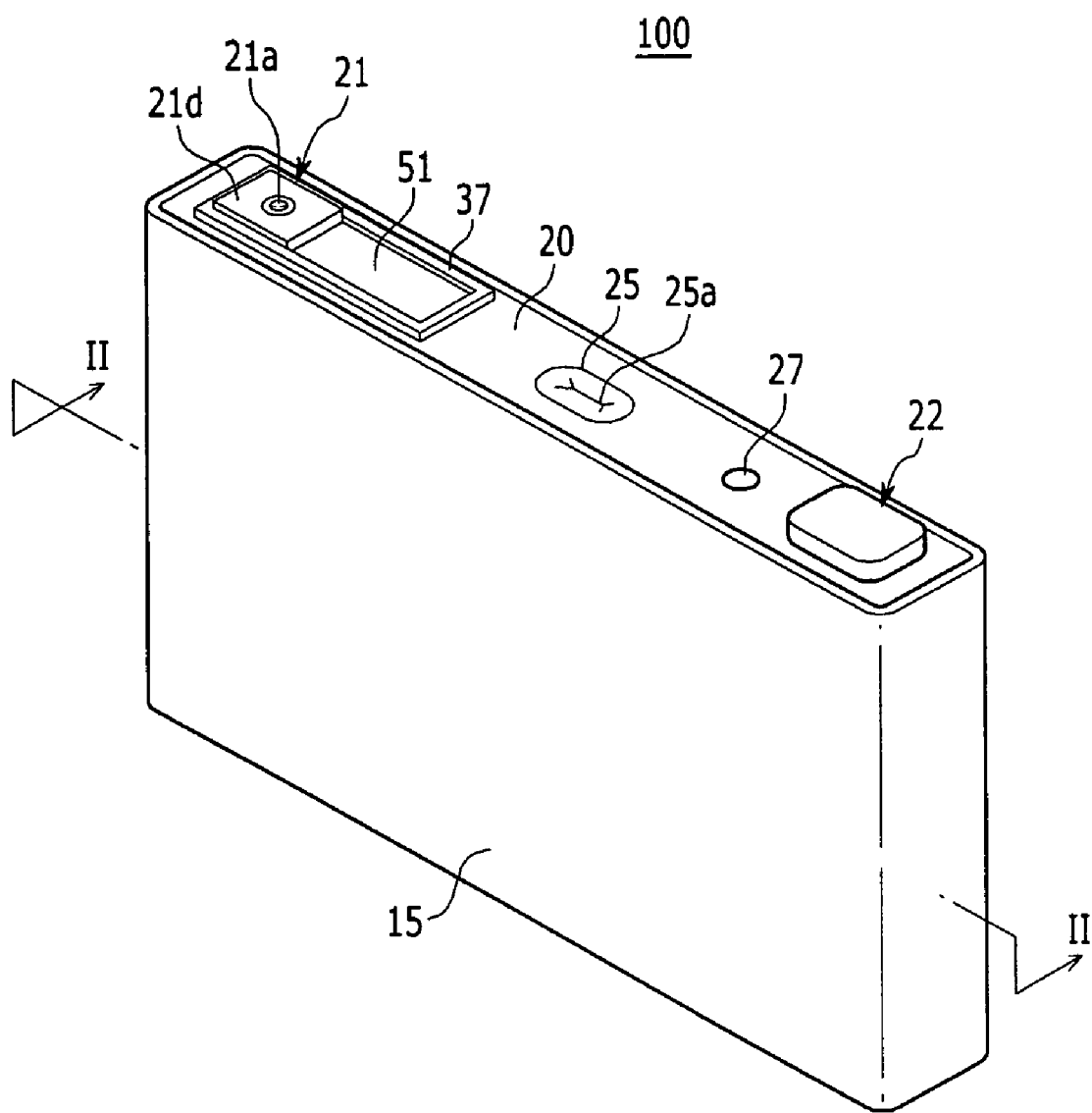
FIG. 1 illustrates a perspective view of a rechargeable battery according to an embodiment.

Korean Patent Application No. 10-2010-0070495, filed on Jul. 21, 2010, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
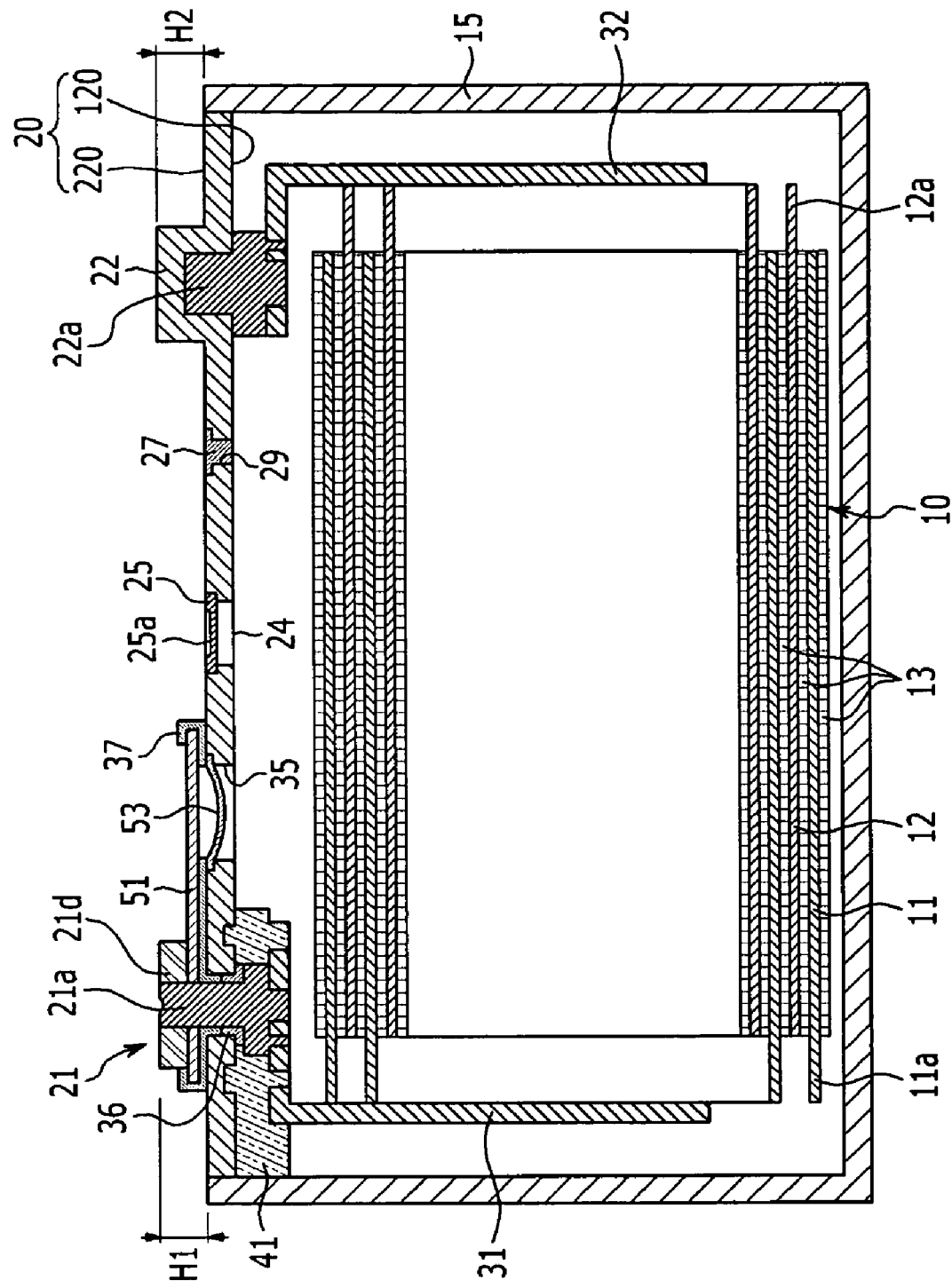
FIG. 2 illustrates a cross-sectional view taken along line II-II of FIG. 1.

FIG. 1 illustrates a perspective view of a rechargeable battery according to an embodiment. FIG. 2 illustrates a cross-sectional view taken along line II-II of FIG. 1. Referring to FIGS. 1 and 2, the rechargeable battery 100 according to the present embodiment may include an electrode assembly 10, a case 15 accommodating the electrode assembly 10, a cap plate 20 coupled to an opening of the case 15, and a first terminal 21 and a second terminal 22 that protrude outwardly from the cap plate 20. In an implementation, the first terminal 21 may be a negative terminal and the second terminal 22 may be a positive terminal.

The electrode assembly 10 may be formed by disposing a first electrode (hereinafter, referred to as "negative electrode") 11 and a second electrode (hereinafter referred to as "positive electrode") 12 on respective surfaces of a separator 13, which is an insulator, and winding the negative electrode 11, the separator 13, and the positive electrode 12 in a jelly roll state. In an implementation, the first electrode 11 may be a negative electrode and the second electrode 12 may be a positive electrode. In an implementation, the electrode assembly may be assembled by stacking the negative electrode and the positive electrode formed as a single plate with the separator interposed therebetween, or may be assembled by bending and stacking the negative electrode, the separator, and the positive electrode in a zigzag pattern (not illustrated).

Each of the negative electrode 11 and the positive electrode 12 may include a coated region where an active material is applied to a current collector formed of a metal plate. In addition, each of the negative electrode 11 and the positive electrode 12 may include uncoated regions 11a and 12a, respectively, at exposed portions of the current collector, without applying the active material. The uncoated region 11a of the negative electrode 11 may be formed at one end of the negative electrode 11 on the wound negative electrode 11. The uncoated region 12a of the positive electrode 12 may be formed at another end of the positive electrode 12 on the wound positive electrode 12. While the electrode assembly 10 is inserted into the case 15, the uncoated regions 11a and 12a may be disposed at both ends of the electrode assembly 10.

The case 15 may be formed in a substantially rectangular parallelepiped shape and may include a space for receiving the electrode assembly 10 and the electrolyte therein. An opening connecting an outer space and an inner space to each other may be formed at one rectangular parallelepiped surface. The opening may facilitate insertion of the electrode assembly 10 into the case 15. The cap plate 20 may be formed of a conductive material, e.g., a thin steel sheet, and may be coupled to the opening of the case 15 to seal the case 15.

The cap plate 20 may further include an electrolyte inlet 29 and a vent hole 24. The electrolyte inlet 29 may facilitate injection of the electrolyte into the case 15 while the cap plate 30 is coupled to the case 15. After the electrolyte is injected, the electrolyte inlet 29 may be sealed by a sealing plug 27.

The vent hole 24 may discharge excessive internal pressure of the rechargeable battery 100 and may be sealed by a vent plate 25. For example, when the internal pressure of the rechargeable battery 100 exceeds a predetermined pressure, the vent plate 25 may be opened. The vent plate 25 may have a notch 25a that facilitates opening.

The rechargeable battery may include an electrode assembly formed by winding a positive electrode and a negative electrode with a separator interposed therebetween, a case accommodating the electrode assembly, a cap plate sealing an opening of the case, and an electrode terminal electrically connected to the electrode assembly through the cap plate.

The cap plate may have a terminal hole. The electrode terminal may be penetratively coupled to the terminal hole with a gasket interposed therebetween. In addition, the electrode terminal may include a plurality of members coupled together and to the terminal hole.

In the rechargeable battery 100 according to the present embodiment, one of the negative terminal and the positive terminal may be installed through the cap plate 20, while the other terminal may be integrally formed with the cap plate 20. For example, as shown in FIG. 1, the first terminal 21 may be installed through the cap plate 20, while the second terminal 22 may be integrally formed with the cap plate 20.

Forming a terminal that is integral with the cap plate 20 may obviate formation of a corresponding terminal hole in the cap plate 20. Therefore, the terminal hole may not be formed in the cap plate 20. Thus, it may be possible to, e.g., improve the sealing performance of the cap plate 20.

The positive terminal 22, which may be integrally formed with the cap plate 20, may protrude outwardly from the cap plate 20. A protrusion height H2 of the positive terminal 22 may be about equal to a height H1 of the negative terminal 21. Accordingly, if a plurality of rechargeable batteries 100 are connected with each other in, e.g., series, a bus bar may be easily connected to the positive terminal 22 and the negative terminal 21. For example, the bus bar (not illustrated) may maintain a horizontal state between adjacent batteries 100.

In an implementation, the negative terminal 21 may be installed through the cap plate 20 and the positive terminal 22 may be integrally formed with the cap plate 20. The negative terminal 21 may be installed in a terminal hole of the cap plate 20 and may be electrically connected to the electrode assembly 10. The positive terminal 22 may be integrally formed with the cap plate 20 and may be electrically connected to the electrode assembly 10.

For example, the negative terminal 21 may be electrically connected to the negative electrode 11 of the electrode assembly 10 through a negative lead tab 31. The positive terminal 22 may be electrically connected to the positive electrode 12 of the electrode assembly 10 through a positive lead tab 32. Therefore, the electrode assembly 10 may be electrically connected to a load or device outside of the case 15 and the cap plate 20, through the negative terminal 21 and the positive terminal 22.

The negative terminal 21 may include a negative pole portion 21a installed in the terminal hole of the cap plate 20, a flange 21b on the negative pole portion 21a inside of the case 15, and a terminal plate 21d outside of the case 15 and coupled to the negative pole portion 21a.

A gasket 36 may be installed between the pole portion 21a of the negative terminal 21 and an inner surface of the terminal hole of the cap plate 20 to seal a space between the negative pole portion 21a of the negative terminal 21 and the cap plate 20. The gasket 36 may further extend between the flange 21b and the cap plate 20 to further seal a space between the flange 21b and the cap plate 20. For example, the gasket 36 may prevent the electrolyte from leaking through the terminal hole after installing the negative terminal 21 on the cap plate 20.

The negative lead tab 31 may electrically connect the negative terminal 21 to the negative electrode 11 of the electrode assembly 10. For example, a bottom of the negative pole portion 21a may be coupled by, e.g., caulking or welding, to the negative lead tab 31 while being supported on the flange 21b. An insulating member 41 may be installed between the negative lead tab 31 and the cap plate 20 to electrically insulate the negative lead tab 31 and the cap plate 20 from each other.

In the rechargeable battery 100 of the present embodiment, an external short-circuit unit that short-circuits the negative electrode 11 and the positive electrode 12 may be provided on the negative terminal 21. For example, the external short-circuit unit may include an insulating member 37 that facilitates the negative electrode 11 and the positive electrode 12 to be spaced apart from or short-circuited with each other, depending on an internal pressure of the rechargeable battery 100. For example, the short-circuit unit may include a short-circuit tab 51 connected to the negative terminal 21 and a short-circuit member 53 connected to the cap plate 20.

Figure 3:
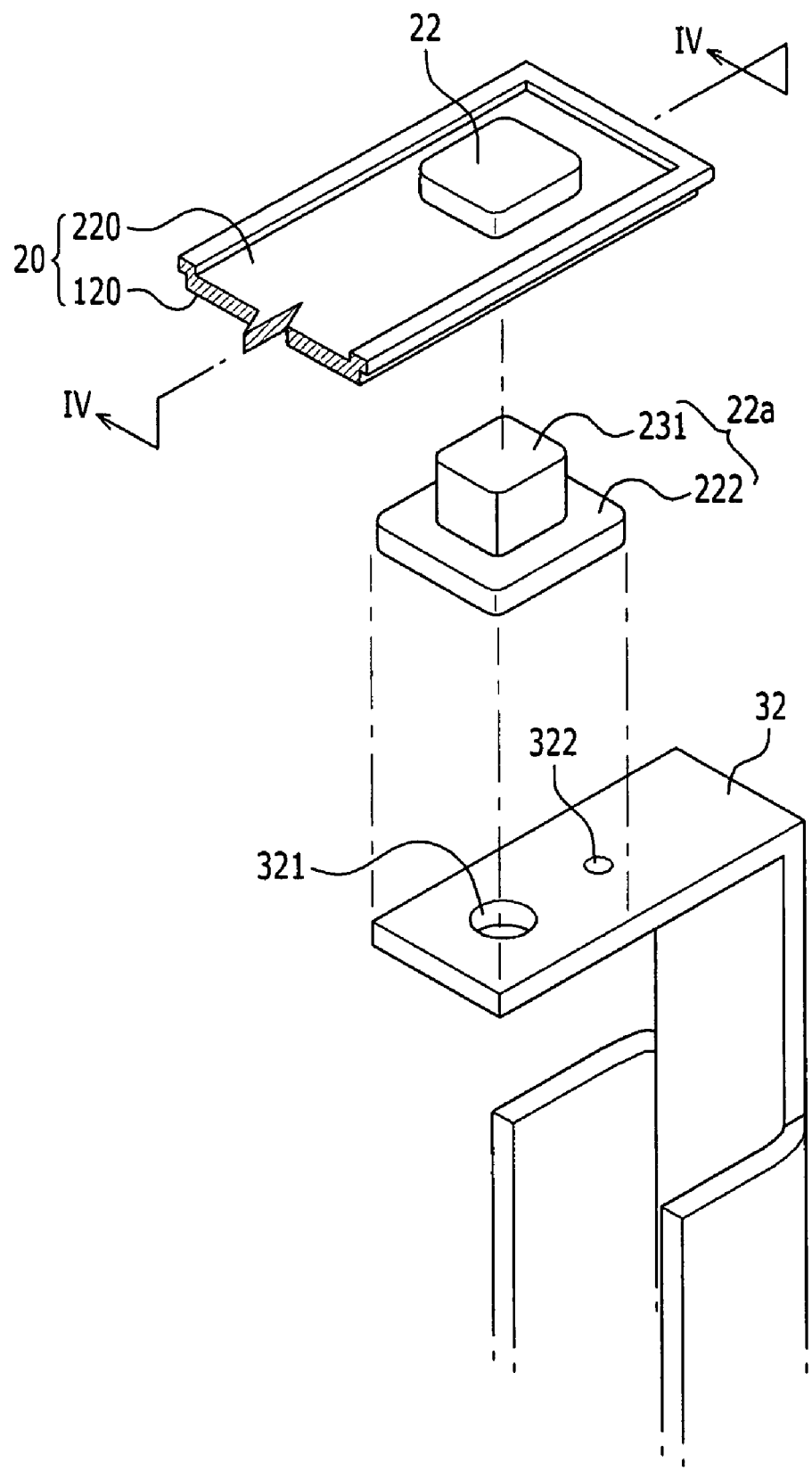
FIG. 3 illustrates an exploded perspective view of a positive lead tab and a cap plate in the rechargeable battery of FIG. 1.
Figure 4:
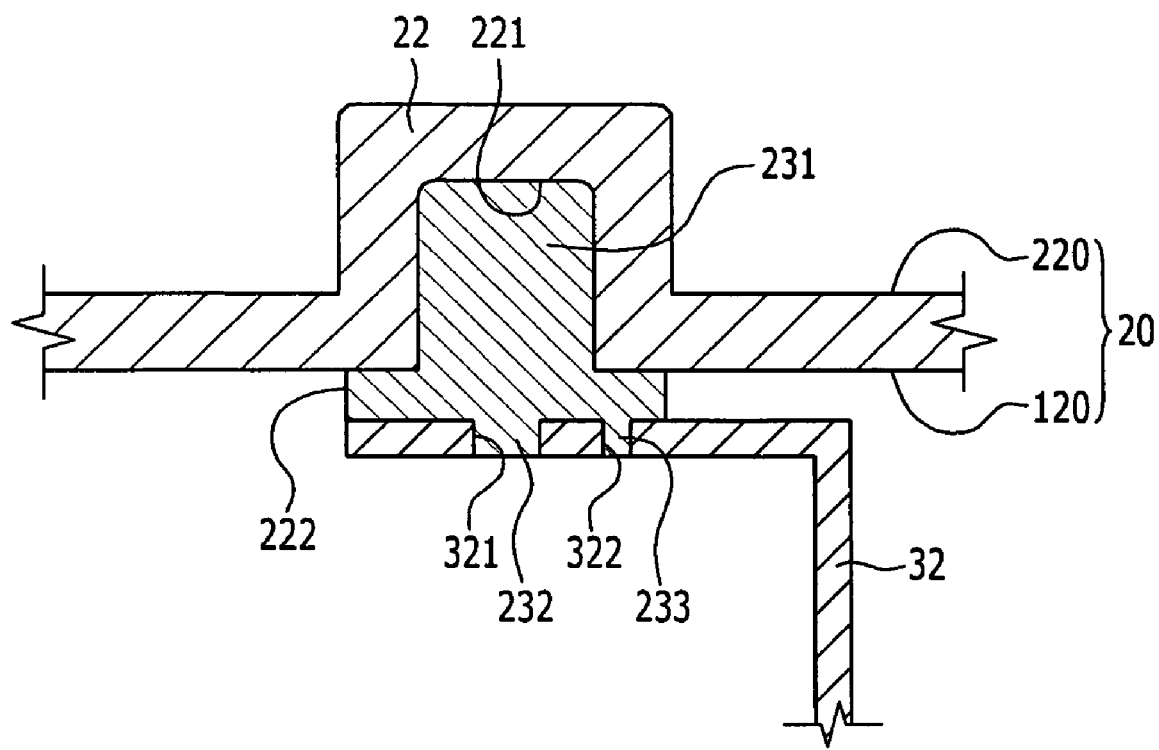
FIG. 4 illustrates a cross-sectional view taken along line IV-IV of FIG. 3.

FIG. 3 illustrates an exploded perspective view of a positive lead tab and a cap plate in the rechargeable battery of FIG. 1. FIG. 4 illustrates a cross-sectional view taken along line IV-IV of FIG. 3. For better comprehension and ease of description, the cap plate 20 is described with reference to a first surface 120 facing an interior or inside of the case 15 and a second surface 220 facing an exterior or outside of the case 15.

Referring to FIGS. 3 and 4, the positive terminal 22 may be electrically connected to the electrode assembly 10 (see FIG. 2). The positive terminal 22 and the cap plate 20 may be integrally formed. For example, the positive terminal 22 may protrude outwardly on the second surface 220 of the cap plate 20, and may be integral with the cap plate 20 so as to form a monolithic unit. The positive terminal 22 may be formed by shaping, e.g., pressing, stamping, molding, etc., the cap plate 20, thereby forming a concave groove 221 having a concavity facing toward the interior of the case 15.

The positive terminal 22 may be electrically connected to a positive pole portion 22a, which may be separately formed. The positive pole portion 22a may include a plate 222 that connects the first surface 120 of the cap plate 20 to a positive lead tab 32. A portion or surface of the plate 222 may be connected to the first surface 120 of the cap plate 20. Another portion or surface of the plate 222 may be connected to the positive lead tab 32. For example, the plate 222 may be connected to the first surface 120 of the cap plate 20 outside of or around the concave groove 221.

The positive pole portion 22a may further include a first protrusion portion 231 protruding from the plate 222 toward the first surface 120 of the cap plate 20. As shown in FIG. 4, the positive pole portion 22a may further include second and third protrusion portions 232, 233 protruding from the plate 222 toward the positive lead tab 32.

The first protrusion portion 231 may be inserted into the concave groove 221 to be coupled to the positive terminal 22. The second protrusion portion 232 may be inserted into and coupled to a main or first through-hole 321 of the positive lead tab 32. The second protrusion portion 232 and the positive lead tab 32 may be physically and electrically connected to each other by, e.g., caulking or welding an end of the second protrusion portion 232.

The positive lead tab 32 may further include an auxiliary or second through-hole 322 adjacent to the main through-hole 321. The third protrusion portion 233 may be inserted into and coupled to the auxiliary through-hole 322. Thus, it is possible to prevent the positive lead tab 32 at a distant side of the main through-hole 321 from being dropped and separated from the plate 222.

The positive lead tab 32 may be connected to the positive pole portion 22a, e.g., the plate 222. In addition, the plate 222 may be coupled to the first surface 120 of the cap plate 20 and the first protrusion portion 231 may be coupled to the concave groove 221. Another end of the positive lead tab may be connected to the positive electrode 12 of the electrode assembly 10. Thus, the positive electrode 12 of the electrode assembly 10 may be electrically connected to the positive terminal 22.

As described above, the positive terminal 22 may be integrally formed with the cap plate 20. Thus, it may be possible to prevent the electrolyte from leaking from the positive terminal 22 by eliminating a terminal hole and gasket structure. According, sealing performance of the cap plate 20 may be improved.

Further, output resistance of the electrode assembly 10 may be reduced when the cap plate 20 and the positive terminal 22 are made of the same material or integrally formed, as opposed to, e.g., multi-component positive terminals that are separated from each other to be coupled to each other. Accordingly, output of the rechargeable battery 100 may be improved.

Hereinafter, other embodiments will be described; and description of the same components will be omitted and different components are compared with each other and described by comparing other embodiments with the previous embodiment.

Figure 5:
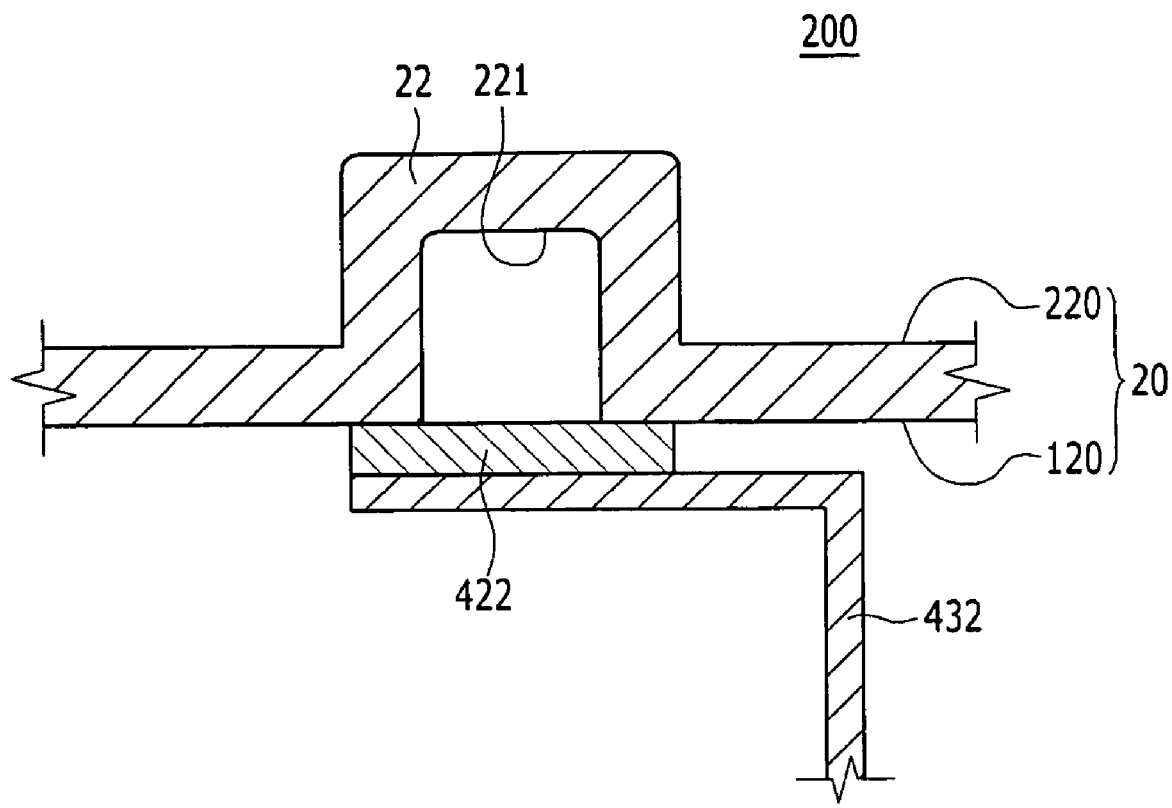
FIG. 5 illustrates a cross-sectional view of an assembled state of a positive lead tab and a cap plate in a rechargeable battery according to another embodiment.

FIG. 5 illustrates a cross-sectional view of an assembled state of a positive lead tab and a cap plate in a rechargeable battery according to another embodiment. Referring to FIG. 5, in the rechargeable battery 200 of the present embodiment, a plate 422 may be connected to the first surface 120 of the cap plate 20 outside of or around the concave groove 221, and may cover the concave groove 221. A positive lead tab 432 may be connected to the plate 422. The plate 422 may effectively connect the positive lead tab 432 formed of, e.g., a thin material, to the first surface 120 of the cap plate 20. Accordingly, the positive lead tab 432, the plate 422, the cap plate 20, and the positive terminal 22 may be electrically connected to each other.

In the connection structure of the present embodiment including the plate 422, the first, second, and third protrusion portions 231, 232, and 233 of the plate 222 of the previous embodiment may be omitted. In the positive lead tab 432 of the present embodiment, the main through-hole 321 and the auxiliary through-hole 322 of the positive lead tab 32 of the previous embodiment may be omitted. Accordingly, a structure to connect the positive lead tab 432 to the positive terminal 22 in the present embodiment may be formed more simply than the structure to connect the positive lead tab 32 to the positive terminal 22 in the previous embodiment.

Figure 6:
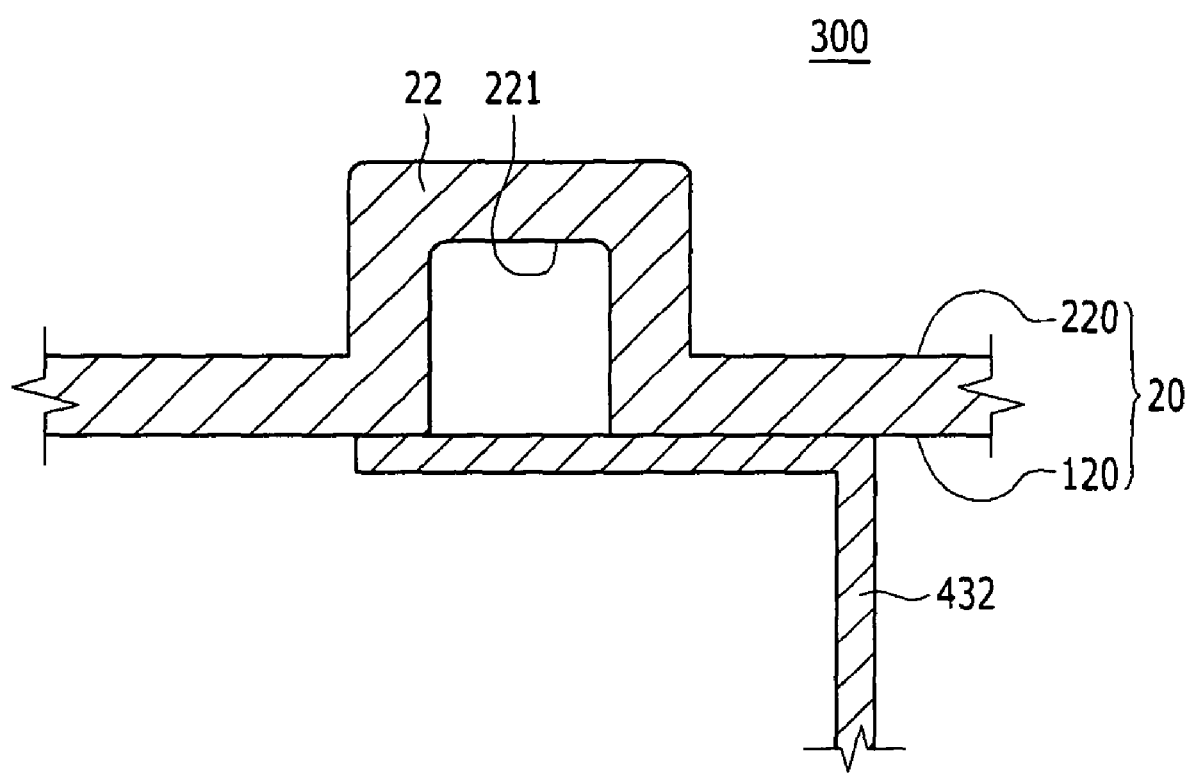
FIG. 6 illustrates a cross-sectional view of an assembled state of a positive lead tab and a cap plate in a rechargeable battery according to yet another embodiment.

FIG. 6 illustrates a cross-sectional view of an assembled state of a positive lead tab and a cap plate in a rechargeable battery according to yet another embodiment. Referring to FIG. 6, in the rechargeable battery 300 of the present embodiment, a positive lead tab 432 may be directly connected to the first surface 120 of the cap plate 20 around the concave groove 221. Accordingly, the positive lead tab 432, the cap plate 20, and the positive terminal 22 may be electrically connected to each other.

In a structure to connect the positive lead tab 432 to the positive terminal 22 in the present embodiment, the plate 422 of the structure to connect the positive lead tab 432 to the positive terminal 22 of the previous embodiment may be omitted. Accordingly, the connection structure may be further simplified.

The rechargeable battery of an embodiment may not include a terminal hole and gasket, thereby exhibiting improved ability to prevent an electrolyte from leaking. Furthermore, the rechargeable battery of an embodiment may not include a plurality of members, thereby decreasing a weight of the electrode terminal, decreasing cost, and decreasing an output resistance of the electrode terminal.

The embodiments provide a rechargeable battery having improved sealing performance on a cap plate and reduced output resistance of an electrode terminal.

According to the embodiments, at least one electrode terminal may be integrally formed with the cap plate to thereby obviate the need for a terminal hole in the cap plate. Thus, sealing performance of the cap plate may be improved. Further, since the cap plate and the electrode terminal may be integrally formed, output resistance between the electrode terminals in an electrode assembly may be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
   an electrode assembly, the electrode assembly including a separator interposed between a first electrode and a second electrode;
   a case, the case accommodating the electrode assembly;
   a cap plate, the cap plate sealing an opening at one end of the case; and
   electrode terminals, the electrode terminals being electrically connected to the electrode assembly,
   wherein:
   the electrode terminals include a first electrode terminal connected to the first electrode and a second electrode terminal connected to the second electrode,
   the first electrode terminal extends through a terminal hole on the cap plate with a gasket interposed between the first electrode terminal and the cap plate,
   the second electrode terminal is integrally formed with the cap plate to form a monolithic unit,
   the second electrode terminal includes a concave groove, the concave groove having a concavity facing toward an inside of the case and being formed by shaping the cap plate, and
   the second electrode terminal overlies the concave groove.

2. The rechargeable battery as claimed in claim 1, wherein a protrusion height of the second electrode terminal integrally formed with the cap plate is equal to a height of the first electrode terminal.

3. The rechargeable battery as claimed in claim 1, wherein:
   the cap plate includes a first surface facing an inside of the case and a second surface facing an outside of the case, and
   the at least one electrode terminal integrally formed with the cap plate protrudes outwardly on the second surface of the cap plate.

4. The rechargeable battery as claimed in claim 1, further comprising a pole portion, the pole portion being between the second electrode terminal and a lead tab, the pole portion contacting the second electrode terminal and the lead tab.

5. The rechargeable battery as claimed in claim 4, wherein the pole portion includes a plate, the plate being connected to the first surface of the cap plate outside of the concave groove.

6. The rechargeable battery as claimed in claim 4, wherein the pole portion includes:
   a plate;
   a first protrusion portion, the first protrusion portion being inserted into the concave groove; and
   a second protrusion portion, the second protrusion portion being inserted into and coupled to a first through-hole of the lead tab.

7. The rechargeable battery as claimed in claim 6, wherein:
   the first protrusion portion is coupled to the concave groove, and
   the plate is coupled to the first surface of the cap plate outside of the concave groove.

8. The rechargeable battery as claimed in claim 6, wherein:
   the lead tab further includes a second through-hole adjacent to the first through-hole, and
   the pole portion further includes a third protrusion portion, the third protrusion portion being inserted into and coupled to the second through-hole.

9. The rechargeable battery as claimed in claim 4, wherein the lead tab is connected to the first surface of the cap plate around the concave groove.

10. The rechargeable battery as claimed in claim 1, further comprising a plate and a lead tab, the plate being connected to the first surface of the cap plate outside of the concave groove and to the lead tab, the lead tab being connected to the electrode assembly.

* * * * *